(12) United States Patent
Wu et al.

(10) Patent No.: US 9,100,980 B2
(45) Date of Patent: Aug. 4, 2015

(54) METHOD, NETWORK ELEMENT AND SYSTEM FOR SCHEDULING COMMUNICATION LINK

(75) Inventors: Yi Wu, Beijing (CN); Hai Jiang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 174 days.

(21) Appl. No.: 13/583,264

(22) PCT Filed: Mar. 8, 2010

(86) PCT No.: PCT/CN2010/000280
§ 371 (c)(1),
(2), (4) Date: Oct. 16, 2012

(87) PCT Pub. No.: WO2011/109918
PCT Pub. Date: Sep. 15, 2011

(65) Prior Publication Data
US 2013/0077606 A1    Mar. 28, 2013

(51) Int. Cl.
*H04W 72/12* (2009.01)
*H04B 7/26* (2006.01)

(52) U.S. Cl.
CPC ......... *H04W 72/1263* (2013.01); *H04B 7/2656* (2013.01); *H04W 72/1257* (2013.01)

(58) Field of Classification Search
CPC ............ H04N 7/16; H04J 3/08; H04W 72/12; H04W 72/1263
See application file for complete search history.

(56) References Cited

U.S. PATENT DOCUMENTS

| 2005/0288027 A1* | 12/2005 | Cho et al. ................. 455/442 |
| 2006/0285511 A1* | 12/2006 | Faerber et al. ............. 370/315 |
| 2008/0137562 A1* | 6/2008 | Li et al. .................... 370/280 |
| 2009/0252098 A1* | 10/2009 | Do et al. ................... 370/329 |

FOREIGN PATENT DOCUMENTS

| CN | 101388718 A | 3/2009 |
| CN | 101404539 A | 4/2009 |

OTHER PUBLICATIONS

3GPP TR 36.913 V10.0.0 (Mar. 2011), "3$^{rd}$ Generation Partnership Project; Technical specification Group Radio Access Network; Requirements for further advancements for further advancements for Evolved Universal Terrestrial Radio Access (E-UTRA) (LTE-Advanced) (Release 10)", 15 pgs.

* cited by examiner

*Primary Examiner* — Anez Ebrahim
(74) *Attorney, Agent, or Firm* — Harrington & Smith

(57) ABSTRACT

Provided is a method for scheduling a communication link, wherein the communication link is adapted for connecting two network elements, wherein a first carrier and a second carrier are assigned to the communication link, wherein each carrier includes frames divided into timeslots, and a predefined number of timeslots is allocated for downlink communication and a predefined number of timeslots is allocated for uplink communication. The method includes scheduling the communication link for offsetting the start of the frames of the first carrier in respect to the start of the frames of the second carrier. Also provided are a network element adapted for carrying out the method and a system including the network element.

12 Claims, 2 Drawing Sheets

| UL/DL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG 3

| CC No. (310) | TDD config (350) | TTI offset (360) | Subframe number (330) | | | | | | | | | |
|---|---|---|---|---|---|---|---|---|---|---|---|---|
| | | | 0 | 1 | 2 | 3 | 4 | 5 | 6 | 7 | 8 | 9 |
| 1 | 5 | 0 | D | S | U | D | D | D | D | D | D | D |
| 2 | 5 | 5 | D | D | D | D | D | D | S | U | D | D |

| CC No. (410) | TDD config (450) | TTI offset (460) | Subframe number (430) | | | | | | | | | |
|---|---|---|---|---|---|---|---|---|---|---|---|---|
| | | | 0 | 1 | 2 | 3 | 4 | 5 | 6 | 7 | 8 | 9 |
| 1 | 1 | 0 | D | S | U | U | D | D | S | U | U | D |
| 2 | 0 | 2 | U | U | D | S | U | U | U | D | S | U |
| 3 | 1 | 0 | D | S | U | U | D | D | S | U | U | D |
| 4 | 0 | 2 | U | U | D | S | U | U | U | D | S | U |

441, 443, 444, 442

METHOD, NETWORK ELEMENT AND SYSTEM FOR SCHEDULING COMMUNICATION LINK

FIELD OF INVENTION

The present invention relates to the field of transmitting data between network elements over a communication link, in particular in an LTE network. In particular, the present invention relates to a method for scheduling a communication link. Further, the present invention relates to a network element, a system comprising the network element, a computer program product and a computer readable medium, which are adapted for performing the above mentioned method.

ART BACKGROUND

In mobile communication networks, especially LTE (long term evolution), TD-LTE (also known as LTE TDD (time division duplex)) is a standard that may be used. In TD-LTE, until now, there are several predefined UL/DL configurations. Uplink-downlink configurations with both 5 ms and 10 ms downlink-to-uplink switch-point periodicity are supported. In case of 5 ms downlink-to-uplink switch-point periodicity, a special switching subframe exists in both half-frames. In case of 10 ms downlink-to-uplink switch-point periodicity, the special subframe exists in the first half-frame only. The ratio of DL throughput to UL throughput could be adjusted by using different UL/DL configurations which is one of the advantages of the TDD mode. Practically, the UL/DL configuration is predetermined by the operator and should be set in coordination all through the whole network for interference issues.

LTE-Advanced, an evolved version of LTE, with bandwidths up to 100 MHz is currently under study to fulfill the targets defined in TR 36.913 ("Requirements for further advancements for E-UTRA/LTE-Advanced"). Here, the 100 MHz system bandwidth may be achieved via aggregation of individual component carriers (CCs). Each component carrier can be limited in bandwidth to 20 MHz. A terminal may simultaneously receive or transmit one or multiple component carriers depending on its capabilities. In some initial discussion, the L1 specification may support carrier aggregation for both contiguous and non-contiguous component carriers. Aggregation of non-contiguous component carriers means the component carriers are either non-adjacent to each other on the same frequency band, or even in totally different frequency bands.

In TDD mode of LTE-A (i.e. TD-LTE-A), the same technology of carrier aggregation can be utilized to improve the capacity and to keep compatible with LTE Rel-8 TDD terminals.

Compared with FDD system, which always has transmission opportunity for both downlink and uplink, the TDD system could only alternate between downlink and uplink transmissions.

Thus, in LTE Advanced system for TDD (time division duplex) or TD-LTE, the available bandwidth can be extended by the means of carrier aggregation. The round trip time (RTT) of HARQ cannot be decreased as it is particularly caused by the TDD UL/DL (uplink, downlink) configuration.

There may be a need for providing an efficient method for scheduling a communication link, which may reduce the round trip time of the end-to-end traffic in TD-LTE-A system for delay sensitive services such as VoIP or real-time gaming.

SUMMARY OF THE INVENTION

This need may be met by the subject matter according to the independent claims. Advantageous embodiments of the present invention are described by the dependent claims.

According to a first aspect of the invention there is provided a method for scheduling a communication link, wherein the communication link is adapted for connecting two network elements, wherein a first and a second carrier is assigned to the communication link, wherein each carrier comprises frames divided into timeslots, wherein a predefined number of timeslots is allocated for downlink communication and a predefined number of timeslots is allocated for uplink communication, the method comprising scheduling the communication link for offsetting the start of the frames of the first carrier in respect to the start of the frames of the second carrier.

This aspect of the invention is based on the idea that in TD-LTE Advanced system, although the available bandwidth can be extended up to 100 MHz by the means of carrier aggregation, for example the HARQ (hybrid automatic repeat request)) round trip time (RTT) cannot be decreased which is particularly caused by the TDD UL/DL configuration. In this invention, is proposed to use a method so that the round trip time of the end-to-end traffic in TD-LTE-A system can be reduced for delay sensitive services such as VoIP or real-time gaming.

Compared with FDD system, which always has transmission opportunity for both downlink and uplink, the TDD system may only alternate between downlink and uplink transmissions. In TDD mode, since there is not always a downlink transmission and uplink transmission in each TTI, the procedure may need to be carefully organized according to the specific uplink-downlink configuration. For example, when the TDD configuration 5 (DSUDDDDDDD) is deployed, there would be only one uplink opportunity for the user equipment in every 10 TTIs, which may lead to some latency problems in the uplink. Considering the fact that from the transport layer (TOP) point of view, the downlink throughput is also related to the TCP ACK feedback speed (i.e. TCP Round Trip Time effect), the only one uplink TTI existence within one radio frame would be not enough especially for high data rate service.

Therefore, a method is provided on the basis of carrier aggregation to reduce the round trip time especially of TD-LTE so that it can approach to the performance of the FDD system.

The principle idea is to have an intelligent permutation for some network elements, for instance eNodeBs, when configuring the component carriers for the LTE-A system. In the carrier aggregation configuration of a LTE-A system, the link between eNB and the UE may be one or more component carriers, and the TDD configurations may be different among different component carriers which would be specified by the operator due to user statistics and service requirement. All through the network, the same component carrier may need to be configured with the same TDD configuration and synchronized with each other in order to avoid inter-cell interference.

According to the provided method, a specified offset between component carriers may be used so that when the eNodeB (eNB) assigns a UE more than one component carrier (CC), it may be possible that the communication between the eNB and user equipment (UE) may have a good pair of UL/DL coexisting in most of the TTIs.

The term "carrier" or component carrier may denote, especially in telecommunications, channels, which are used as a carrier system being a multichannel telecommunications system in which a number of individual channels are multiplexed for transmission.

The term "time slot" may denote a time slot or subframe of a frame. The carriers may be divided into frames, which may comprise a plurality of subframes or timeslots. The carriers may be organized for time division duplexing.

In the following there will be described exemplary embodiments of the present invention.

According to an embodiment of the invention, the first carrier comprises a different frame configuration than the second carrier.

Each carrier may comprise a special configuration. This means that specific timeslots may be used for downlink and specific timeslots may be used for uplink communication.

According to a further embodiment of the invention, a plurality of carriers is assigned to the communication link and wherein scheduling comprises offsetting the start of the frames of a predetermined number of carriers of the plurality of carriers in respect to the start of the frames of at least one of the remaining carriers.

If a plurality of carriers is assigned to the communication link, this may be called carrier aggregation. The start of the frames of each or a part of the carriers may be shifted in respect to the other carriers. Thus, a good ration of uplink and downlink assigned time slots may be achieved.

According to a further embodiment of the invention, the carriers of the plurality of carriers comprise various frame configurations. This may mean that each carrier may comprise a different configuration than the other carriers. Also all carriers may comprise the same frame configuration. This may depend on operator's requirements.

According to a second aspect of the invention there is provided a network element, which is adapted for connecting with a further network element via a communication link, wherein the communication link comprises the following features: a first and a second carrier is assigned to the communication link, each carrier comprises frames divided into timeslots, a predefined number of timeslots is allocated for downlink communication and a predefined number of timeslots is allocated for uplink communication, and the communication link is scheduled for offsetting the start of the frames of the first carrier in respect to the start of the frames of the second carrier. The network element may further comprise a scheduling unit for scheduling the communication link for offsetting the start of the frames of the first carrier in respect to the start of the frames of the second carrier.

The network element comprising a scheduling unit may be for instance an eNodeB.

This aspect is also based on the idea to have an intelligent permutation for some network elements when configuring the component carriers for the LTE-A system. The network elements may be for example user equipments, relay nodes or base stations (eNodeBs, eNBs).

According to a further embodiment of the invention, the network element further comprises a unit for determining the offset based on a round trip time and/or a frame configuration of the carriers.

The offset may depend for example on any operator's requirements, a good ratio for UL and DL timeslots to get a low round trip time.

According to a further aspect of the invention, a system is provided comprising a network element with some or all of the above mentioned features, and a communication link adapted for connecting the network element with a further network element, wherein a first and a second carrier is assigned to the communication link, wherein each carrier comprises frames divided into timeslots, wherein a predefined number of timeslots is allocated for downlink communication and a predefined number of timeslots is allocated for uplink communication, and wherein the communication link is scheduled for offsetting the start of the frames of the first carrier in respect to the start of the frames of the second carrier.

According to a further embodiment of the invention, the communication link comprises a plurality of carriers. The communication link may be configured for example by carrier aggregation. The communication link may especially be configured for a time division duplexing.

According to a further embodiment of the invention, the communication link comprises contiguous and/or noncontiguous carriers. This means that the carriers may be adjacent to one another in respect of the frequencies (contiguous) or not adjacent, or even in different frequency bands (noncontiguous).

According to a further aspect of the invention there is provided a computer-readable medium (for instance a CD, a DVD, a USB stick, a floppy disk or a hard disk), in which a computer program for scheduling a communication link, is stored, which computer program, when being executed by a processor, is adapted to carry out or control a method for scheduling a communication link.

According to a further aspect of the invention there is provided a program element (for instance a software routine, in source code or in executable code) for scheduling a communication link, which program element, when being executed by a processor, is adapted to carry out or control a method for scheduling a communication link.

Scheduling a communication link, which may be performed according to aspects of the invention can be realized by a computer program, that is by software, or by using one or more special electronic optimization circuits, that is in hardware, or in hybrid form, that is by means of software components and hardware components.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 3 shows a table illustrating a scheduling according to an embodiment of the invention.

FIG. 4 shows a table illustrating a scheduling according to an embodiment of the invention.

DETAILED DESCRIPTION

Figures 1, 2:
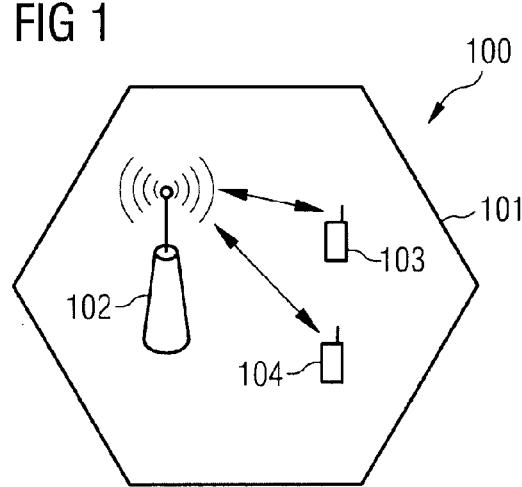
FIG. 1 shows a system according to an embodiment of the invention.
FIG. 2 shows a table illustrating typical frame configurations.

The illustration in the drawing is schematically. It is noted that in different figures, similar or identical elements are provided with reference signs, which are different from the corresponding reference signs only within the first digit.

FIG. 1 shows a mobile network 100 according to an embodiment of the invention. The mobile network 100 comprises at least one cell 101. A base station or eNodeB 102 is located in and assigned to this cell. One or more user equipments 103, 104 are connected to the base station via communication links. One or more carriers may be assigned to the communication links.

In TD-LTE, which may the network configuration, there are 7 UL/DL configurations as shown in FIG. 2. In the UL/DL configurations 210 comprising different subframes or timeslots 230, besides the general downlink (DL) subframe "D" and uplink (UL) subframe "U", there exists a special switching subframe denoted by "S". Uplink-downlink configurations with both 5 ms and 10 ms downlink-to-uplink switch-point periodicity 220 are supported. In all UL/DL configurations, a frame starts with a first subframe 240. In case of 5 ms downlink-to-uplink switch-point periodicity, the special subframe exists in both half-frames. In case of 10 ms downlink-to-uplink switch-point periodicity, the special subframe exists in the first half-frame only. The ratio of DL throughput to UL throughput could be adjusted by using different UL/DL configurations which is one of the advantages of the TDD mode. Practically the UL/DL configuration is predetermined by the operator and should be set in coordination all through the whole network for interference issues.

In LTE-Advanced, an evolved version of LTE, with bandwidths up to 100 MHz, the 100 MHz system bandwidth is achieved via aggregation of individual component carriers (CCs) following the Rel 8 (Release 8 of LTE) numerology. Each component carrier may be limited in bandwidth to 20 MHz. A terminal may simultaneously receive or transmit one or multiple component carriers depending on its capabilities. In some initial discussion, the L1 specification shall support carrier aggregation for both contiguous and non-contiguous component carriers. Aggregation of non-contiguous component carriers means the component carriers are either non-adjacent to each other on the same frequency band, or even in totally different frequency bands.

In TDD mode of LTE-A (i.e. TD-LTE-A), the same technology of carrier aggregation may be utilized to improve the capacity and to keep compatible with LTE Rel-8 TDD terminals.

Compared with FDD system, which always has transmission opportunity for both downlink and uplink, the TDD system could only alternate between downlink and uplink transmissions. In TDD mode, since there is not always a downlink transmission and uplink transmission in each TTI, the procedure needs to be carefully organized according to the specific uplink-downlink configuration. For example, when the TDD configuration 5 (DSUDDDDDDD) of FIG. 2 is deployed, there would be only one uplink opportunity for a user equipment (UE) in every 10 TTIs, which may lead to some latency problems in the uplink. Considering the fact that from the transport layer (TCP) point of view, the downlink throughput is also related to the TCP ACK feedback speed (i.e. TCP Round Trip Time effect), the only one uplink TTI existence within one radio frame would be not enough especially for high data rate service.

In the LTE-A system, if the component carriers are non-continuous deployed in the bandwidth aggregation, an intelligent permutation for the CCs may be used in order to compensate the asymmetric DL/UL opportunity in some latency-critical scenario.

Thus, a method may be used on the basis of carrier aggregation to reduce the round trip time of TD-LTE so that it can approach to the performance of the FDD system. The method be used mainly for the non-contiguous CC deployment scenario, but may also be used for every other configuration of carriers.

The principle idea is to have an intelligent permutation for the eNBs when configuring the component carriers for the LTE-A system. In the carrier aggregation configuration of a LTE-A system, the link between eNB and the UE may be one or more component carriers, and the TDD configurations may be different among different component carriers which would be specified by the operator due to user statistics and service requirement. All through the network, the same component carrier may need to be configured with the same TDD configuration and synchronized with each other in order to avoid inter-cell interference.

In this system and method, a specified offset between component carriers is introduced so that when for example the eNB assigns a UE more than one CC, it would be possible that the communication between the eNB and UE will have a good pair of UL/DL coexisting in most of the TTIs.

Based on the inventive idea, there may be several possible permutations for the CCs with different TTI offsets.

In FIG. 3, an example of a frame configuration according to an embodiment of the invention is shown to illustrate the use of the method. One of the typical examples is the use of TDD configuration 5 (350), where the downlink service dominates the overall traffic. Considering the fact that from the transport layer (TCP) point of view, the downlink throughput is also related to the TCP ACK feedback speed (i.e. TCP Round Trip Time effect), the only one uplink TTI occurring within one radio frame would not be enough especially for high data rate service. Correspondingly, more than one of the CCs with TDD configuration 5 could be deployed with different offset, for example 0 and 5 (360) leading to shifted start of the subframes 330 or frames. FIG. 3 shows the different start times of the two carriers 310, see reference numbers 341 and 342. With this kind of pairing, although the DL to UL ratio could still be kept as high as 9:1 approximately, the frequency of uplink opportunity is doubled. Therefore, the RTT of high layer protocols could be decreased and the throughput is improved.

It should be noted that the proposed method may be extended to various scenarios according to different TDD configurations and grouping disciplines based on operators' requirements. The principle concept is to make the DL and UL distribution more evenly across the subframe alignment.

For example, as TDD configuration 1 and 0 are most interested by the TDD operators (e.g. China Mobile), the example of the permutation list with 4 CC candidates in FIG. 4 shows that a FDD-alike DL/UL distribution may be achieved.

The four carriers 410 are configured according to TDD configuration 1 and 0 (450). The CCs with configuration 0 are shifted with an offset of 2 (460) leading to a shifting of the start of the frames 442, 444 in respect to the start of the frames 441, 443 of the CCs with an offset of 0. Thus, the DL/UL distribution of the subframes 430 may be FDD alike.

Since all new LTE-Advanced features should be supported without the need to violate Release 8 compatibility, the proposed special carrier aggregation method may also need to be Release 8 compliant. As the R8 UE can also access to the LTE-A eNB, there may exist two different types of UE: the LTE-A UE which supports multiple component carriers and the R8 UE which supports the single carrier. Therefore, the eNB may have a check on the accessed UE and maintain a list of R8 UEs in order to differentiate them from the R10 (LTE-A) UE. The RRM
could you please insert a definition for RRM?
scheme would only schedule the LTE-A UEs over the multiple component carriers, where the method according to embodiments of the invention could be employed. For R8 compatibility, because the eNB only schedules the R8 UEs over the single carrier, the scenario of allocating one HARQ entity over two binding component carriers would not happen. In this way, the Release 8 compatibility will not be violated.

In implementation, since the method introduces different TDD configurations among multiple CCs, the TDD configuration for each individual CC may be set in coordination all through the whole network for interference issues. Therefore, the operator may pre-define a mapping of the TDD configuration to all the CCs it supports.

By utilizing the intelligent CC permutation and compensation according to embodiments of the invention, the distribution of the DL and UL opportunity may be more even in the time scale and accordingly, the round trip delay of the upper layer protocols such as TCP may be reduced a lot which may result in an improved throughput performance.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method comprising:
    assigning a plurality of carriers to a communication link adapted for connecting two network elements, wherein the carriers of the plurality of carriers exhibit time division duplex frame configurations that are different from one another, and wherein the different time division duplex frame configurations are permutated so as to achieve a downlink/uplink subframe distribution similar to frequency division duplex, wherein a predetermined number of carriers of the plurality of carriers exhibit a frame configuration different from that of the remaining carriers, and wherein each carrier comprises frames divided into timeslots;
    allocating a predefined number of timeslots for downlink communication and a predefined number of timeslots for uplink communication, wherein the uplink and downlink timeslots are evenly allocated across subframes present in each frame; and
    scheduling the communication link so as to offset the start of each frame of a predetermined number of carriers of the plurality of carriers with respect to the start of each of the frames of the remaining carriers.

2. The method as set forth in claim 1, wherein at least two of the carriers of the plurality of carriers exhibit frame configurations different from one another.

3. The method of claim 1, wherein the offset is determined based at least in part on one or both of a round trip time or a frame configuration of the carriers.

4. The method of claim 1, wherein the communication link comprises contiguous carriers.

5. The method of claim 1, wherein the communication link comprises noncontiguous carriers.

6. The method of claim 1, wherein the communication link comprises both contiguous and noncontiguous carriers.

7. An apparatus comprising:
    at least one processor;
    memory storing computer program code;
    wherein the memory storing the computer program code is configured to, with the at least one processor, cause an apparatus to at least:
    connect with a network element via a communication link having a plurality of carriers assigned to the communication link, wherein the carriers of the plurality of carriers exhibit time division duplex frame configurations that are different from one another, wherein the different time division duplex frame configurations are permutated so as to achieve a downlink/uplink subframe distribution similar to frequency division duplex, wherein a predetermined number of carriers of the plurality of carriers exhibit a frame configuration different from that of the remaining carriers, wherein each carrier comprises frames divided into timeslots with a predefined number of timeslots being allocated for downlink communication and a predefined number of timeslots being allocated for uplink communication, and wherein the uplink and downlink timeslots are evenly allocated across subframes present in each frame; and
    schedule the communication link to offset the start of each frame of a predetermined number of carriers of the plurality of carriers with respect to the start of each frame of the second carrier; and
    schedule the communication link to offset the start of each frame of the plurality of carriers with respect to the start of each of the frames of the remaining carriers.

8. The apparatus as set forth in claim 7, wherein the offset is determined based at least in part on one or both of a round trip time or a frame configuration of the carriers.

9. A non-transitory computer readable medium storing a program of instructions, execution of which by a data processor configures an apparatus to perform the method as set forth in claim 1.

10. A non-transitory computer readable medium storing a program of instructions, execution of which by a processor configures an apparatus to at least:
    connect with a network element via a communication link, having a plurality of carriers assigned to the communication link, wherein the carriers of the plurality of carriers exhibit time division duplex frame configurations that are different from one another, wherein the different time division duplex frame configurations are permutated so as to achieve a downlink/uplink subframe distribution similar to frequency division duplex, wherein a predetermined number of carriers of the plurality of carriers exhibit a frame configuration different from that of the remaining carriers, wherein each carrier comprises frames divided into timeslots with a predefined number of timeslots being allocated for downlink communication and a predefined number of timeslots being allocated for uplink communication, and wherein the uplink and downlink timeslots are evenly allocated across subframes present in each frame; and
    schedule the communication link to offset the start of each frame of a predetermined number of carriers of the plurality of carriers with respect to the start of each frame of the second carrier; and
    schedule the communication link to offset the start of each frame of the plurality of carriers with respect to the start of each of the frames of the remaining carriers.

11. The computer readable medium of claim 10, wherein the predetermined number of carriers of the plurality of carriers exhibit a frame configuration different from that of the remaining carriers.

12. The computer readable medium of claim 10, wherein the offset is determined based at least in part on one or both of a round trip time or a frame configuration of the carriers.

* * * * *